United States Patent [19]
Barter

[11] 3,767,899
[45] Oct. 23, 1973

[54] DIGITAL INTEGRATOR FOR EVALUATING OPERATOR SELECTED PORTIONS OF ANALOG CHART TRACES

[75] Inventor: Le Roy D. Barter, Fullerton, Calif.
[73] Assignee: Beckman Instruments, Inc., Fullerton, Calif.
[22] Filed: Aug. 7, 1972
[21] Appl. No.: 278,218

[52] U.S. Cl. .......................... 235/61.6 A, 346/33 R
[51] Int. Cl. ......................... G06k 15/02, G01d 9/22
[58] Field of Search .................. 235/61.6 A, 61.6 B; 318/568, 577, 578; 346/33 R

[56] References Cited
UNITED STATES PATENTS

| | | | |
|---|---|---|---|
| 2,866,596 | 12/1958 | Hoefs et al. | 235/61.6 A |
| 3,253,273 | 5/1966 | Allen et al. | 235/61.6 A |
| 3,268,905 | 8/1966 | Woods et al. | 235/61.6 A |
| 3,706,877 | 12/1972 | Clifford, Jr. et al. | 235/61.6 A |

Primary Examiner—Daryl W. Cook
Attorney—James M. Thomson et al.

[57] ABSTRACT

An operator-controlled system for selecting and evaluating components of an analog chart trace during a recording operation. The system calculates predetermined information, such as area under the trace, for one or more operator-selected components of the chart trace and prints out the calculated information upon the chart paper. Means are provided for monitoring the instantaneous position of the recording pen at successive intervals during recording. Other means are provided for retaining digital coded signals, proportional to the pen positions at such intervals, in a delay line for a predetermined delay interval. An operator-controlled delimit pen is provided downstream of the recording pen for selecting the beginning and end points of the desired components of the trace when a relatively full view of the trace is available. Operation of the delimit pen causes the delayed coded signals corresponding to a given component of the chart trace to be accumulated in a component accumulator and sent to a selected memory register. Upon completion of the recording operation the operator presses a calculate button to initiate calculation of desired information for each component of the chart trace, and to control the printing of the information upon the chart paper.

10 Claims, 1 Drawing Figure

PATENTED OCT 23 1973 3,767,899
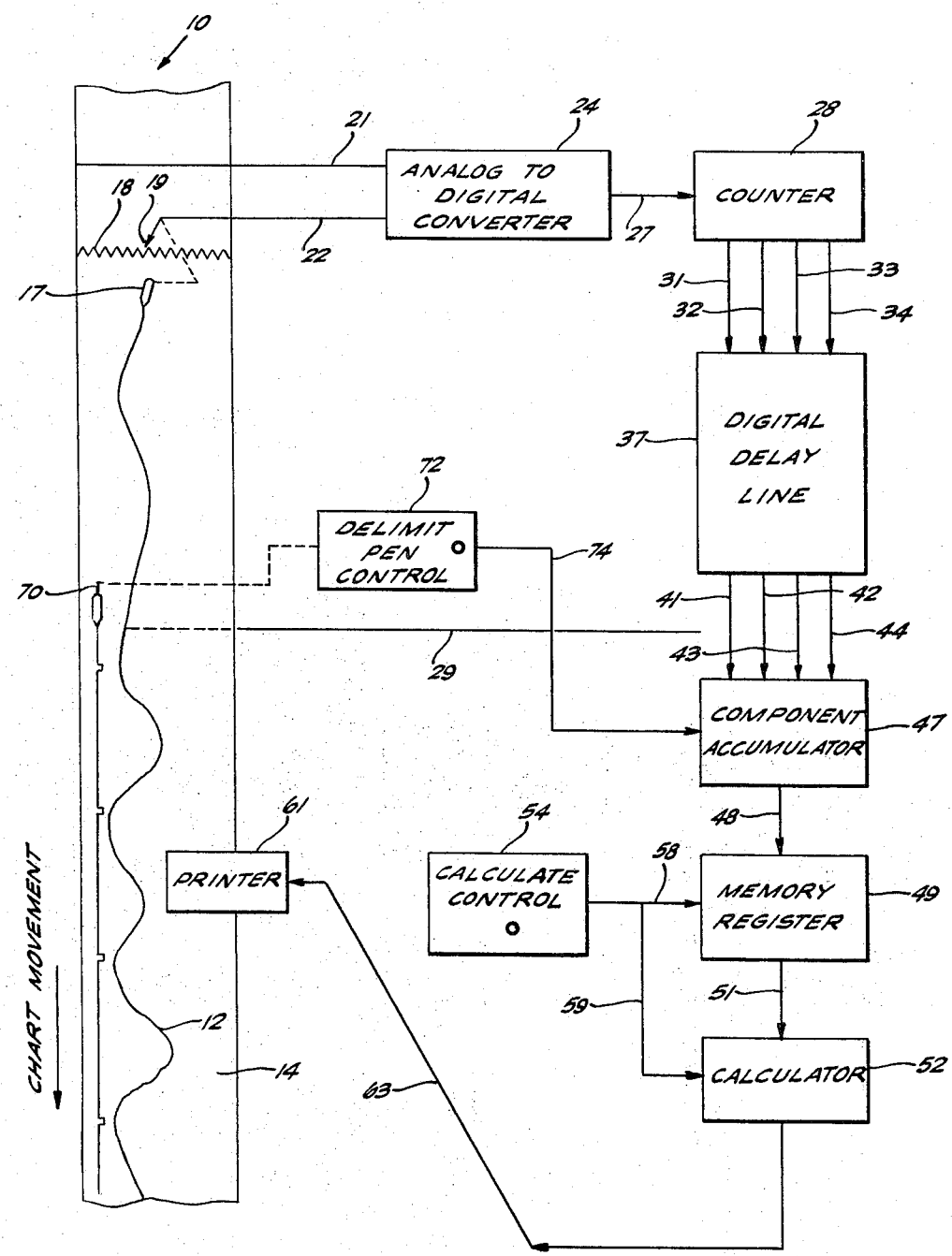

3,767,899

DIGITAL INTEGRATOR FOR EVALUATING OPERATOR SELECTED PORTIONS OF ANALOG CHART TRACES

BACKGROUND OF THE INVENTION

The present invention concerns a system for selecting and evaluating one or more components of an analog chart trace during a recording operation. More particularly the invention concerns a system wherein the operator selects the beginning and end points of desired components of a chart trace when a relatively full view of the chart trace is available, and later initiates a calculating operation wherein certain information is calculated with respect to the selected component of the trace. The calculated information is printed upon the chart paper for preservation.

Various systems have been designed in the past for automatic analysis of analog chart traces and component portions thereof. In such systems it is generally a purpose to analyze the characteristics of the analog trace and to calculate certain values, for example, the area encompassed by a certain component of the analog trace.

One of the problems encountered in such systems is the selection of the portion of the chart which is of interest, sometimes referred to as a component. Certain systems in the prior art generate electrical signals proportional to the chart trace and use electronic analyzing circuitry for automatically determining the beginning and end points of the components of interest. However, these systems do not produce satisfactory results in all cases since the analog traces are not always smooth and continuous. Thus, analyzing circuits often give false beginning or end signals upon the occurrence of discontinuities in an otherwise continuously increasing or decreasing trace.

Operator-controlled systems have been designed which allow an operator to view the trace and select a desired component for analysis. Such systems are often subject to problems in that they do not permit an operator to view a sufficient portion of the chart trace prior to making the selection. Furthermore some such systems do not permit the analysis of a given trace upon the recording pass of the chart. Consequently, in using such systems it is necessary to first make a recording run of the chart and then to process the chart trace separately in an evaluation run. This leads to repetitive operations which are costly and time consuming.

Finally, another drawback in the use of such systems has been the omission of means for printing information relating to the components of interest upon the chart itself.

SUMMARY OF THE INVENTION

Accordingly, it is an object of the invention to provide an operator-controlled system for selecting and evaluating components of an analog chart trace which overcomes the disadvantages of prior art systems mentioned hereinbefore.

It is another object of the invention to provide an operator-controlled system for evaluating an analog chart trace which permits an operator to view a substantial portion of the chart trace prior to the selection of a given component or components of interest.

It is a further object of the invention to provide an operator-controlled system for selecting and evaluating components of an analog chart trace during a single recording run.

It is yet another object of the invention to provide, in an operator-controlled system for selecting and evaluating components of an analog chart trace, means for printing the results of the evaluation upon the chart itself.

These and other objects and features of the invention are attained in a system that calculates predetermined information such as area under the trace, for one or more operator-selected components of the analog trace and then prints out the calculated information upon the chart paper. Means are provided for monitoring the instantaneous position of the recording pen at successive intervals during the recording operation, and then holding digital coded signals proportional to the pen positions in a delay line for a predetermined interval. An operator-controlled delimit pen is provided downstream of the recording pen for selection of the desired components of the trace after a satisfactory view of the trace is available. The selection of the beginning and end points of a given component are accomplished at the same time that the digital signals relating to the component are released from the delay line. Accordingly, operation of the delimit pen directs the coded signals corresponding to a given component of the chart to a component accumulator and then to a selected memory register. Upon completion of the recording operation, the operator presses a calculate button to initiate calculation of the desired information for each component of the trace, and to control the printing of the information upon the chart paper for preservation thereof.

BRIEF DESCRIPTION OF THE DRAWINGS

Other features and advantages of the invention will become apparent from the following detailed description of the invention taken in conjunction with the accompanying drawing which comprises a schematic diagram of an operator-controlled system for selecting and evaluating components of an analog chart trace.

DETAILED DESCRIPTION OF THE INVENTION

Referring now to the drawing one preferred embodiment of an operator-controlled system for selecting and evaluating components of an analog chart trace is illustrated. The system 10 is adapted for use with a chart trace 12 formed upon a chart 14 forming part of a conventional chart recorder that is adapted to record and display analog information, such as the output of an associated analytical instrument. Conventional means, not illustrated, are provided for starting and stopping the chart and for selectively advancing the chart in the direction indicated by the arrow. The chart recorder also includes a recording pen 17 associated with the chart in a conventional manner for forming an analog trace thereon. A sensing device such as a potentiometric element 18 is also provided. The potentiometric element is energized from a suitable voltage source and includes a movable wiper 19 that is associated with recording pen 17 for producing an analog voltage proportional to the instantaneous position of the pen with respect to the chart paper. More particularly, the wiper of the potentiometric element is adapted to produce a low d.c. voltage output when the pen is near the left-hand side of the chart paper and to produce a high d.c.

voltage output when the pen is near the righthand side of the chart paper as viewed in the drawing.

The voltage output from the wiper is supplied via conductors 21, 22 as the input signal to an analog-to-digital converter 24 of conventional design. Converter 24 receives d.c. signals from the wiper and periodically produces a digital pulse output wherein the time rate of the pulses is proportional to the amplitude of the d.c. input. The pulses are supplied via a conductor 27 to a binary counter 28 of conventional design. The binary counter is adapted to count the pulses from converter 24 and to produce a binary coded output on four output lines 31–34. The counter then resets and counts the next set of pulses from the converter. It should be apparent that each output from the counter corresponds to a predetermined section of the chart trace.

Each binary coded output is supplied via output lines 31–34 to a digital delay line 37 comprising a 4 × 100 bit shift register. Thus each coded signal is entered into the shift register held there for a predetermined delay period comprising 100 shifts and is then released from the delay line on output lines 41–44, respectively. The delayed signals are released at a time which corresponds to the time that the segment of the trace matching the coded signal reaches a delimit line 29 indicated in the drawing. The significance of this delay interval will become apparent hereinafter.

The coded signals are supplied to a component accumulator 47 of conventional design which produces an output count that is supplied to a memory register 49 via a conductor 48. The counter is then reset. The memory registers are selectively connected via line 51 to a calculator 52. The calculator and the memory registers are controlled by an operator-actuated calculate control 54 which sends signals, respectively, to the memory register and to the calculator via conductors 58, 59. The calculator is a conventional unit including an arrangement of counters adapted to perform suitable calculations upon the digital data transferred thereto from the memory registers. In the present invention the ratio of the area under the trace for each selected component to the total area under the trace is calculated. Then, in addition each ratio is multiplied by a proportionality constant to provide the component area in suitable units. However, other desired calculations could be performed, if desired. The output of the calculator is utilized to control a printer 61 via conductor 63 whereby the calculated information is printed upon chart 14.

The system otherwise includes a delimit pen 70 suitably suspended over the chart paper downstream of the recording pen. The delimit pen is controlled by a delimit pen control 72 that is operator-actuated. The delimit pen normally provides a straight trace on the lefthand margin of the chart. However, upon operation of the delimit pen control button the delimit pen is actuated to form a cursor mark or spike on the chart opposite the analog trace. The first cursor mark indicates the beginning of a component of the trace. At the same time the delimit pen places the cursor mark on the chart, the delimit pen control sends a signal via conductor 74 to the component accumulator 47. This component accumulator control signal clears the accumulator, resets it, and permits subsequent binary coded output signals from the digital delay line 37 to be accumulated. Then, upon a subsequent operation of the delimit pen control button, another cursor mark is placed upon the chart by the delimit pen and an end signal is sent to the component accumulator. Upon reception of the end signal the component accumulator contents are cleared into a selected memory register, the accumulator is reset and another cycle is started for accumulating binary coded output signals from the delay line. It should be apparent that the end signal for one component of the trace is, effectively, the beginning signal for the next component.

In operation of the system, as the recording pen produces a trace, the d.c. voltage from the potentiometer wiper 19 is converted to a digital pulse output wherein each pluse is, effectively, equivalent to a unit of area under the portion of the chart trace formed during a given interval which can be characterized as a sampling interval. These digital pulses are selectively counted in the binary counter and converted to a binary code which is supplied to the delay line. As the corresponding portion of the trace passes the delimit line the binary code pulse outputs are released from the delay line. Accordingly, when the operator pushes the delimit button and produces a cursor mark on the chart, the beginning component signal sent to the component accumulator causes the binary code outputs to be accumulated in the component counter. When the operator next pushes the delimit button indicating the end of that component and the beginning of the next component, the delimit pen places another cursor mark upon the chart and an end signal is sent to the component accumulator causing the contents of the accumulator to be unloaded into a predetermined memory register. The counter is immediately reset and starts accumulating the binary coded signals for the next component.

It should be apparent that the portion of the chart trace that is visible to the operator prior to the component selection step is dependent upon the length of delay afforded by the delay line. In the present embodiment a delay line of 100 delay steps has been utilized. However, other suitable delay intervals could be utilized, if desired.

At the end of the recording run, the operator initiates a calculate cycle by actuating the calculate control so that the stored information related to a given component is unloaded from the memory register to the calculator. Appropriate calculations are then performed upon such information and the calculator provides a signal to printer 61 causing the calculated information to be printed upon the chart. The calculator then handles the information for the next component and the cycle is repeated until the appropriate information for each selected component is printed upon the chart.

One advantage of the operation of the system in this regard is that the evaluation of the chart trace and the calculations related thereto are carried out during one pass of the chart without significantly increasing the operator time per record. Furthermore the results of the calculations are printed out on the chart that has just been run thereby preserving the results in context with the analog trace and well identified components. Another advantageous feature is the provision of a substantial portion of the analog trace in a position viewable by the operator prior to the time that component selection is made. This enables the operator to get a full view of the portions of the trace that are of interest before a decision has to be made as to the placement of the cursor marks that define the components. This is accomplished, however, without delaying the advancement of the chart whereby ordinary recording operations can be carried out.

What is claimed is:

1. An operator-controlled system for selecting and evaluating components of an analog chart trace during the recording thereof, comprising
    sampling means for successively developing groups of digital electrical signals proportional to the instantaneous position of the recording pen at predetermined sampling intervals during formation of the chart trace,
    delay means for receiving and delaying each of said groups of signals for a predetermined time delay interval,
    accumulator means electrically connected to said delay means for selectively accumulating said groups of signals,
    storage means electrically connected to said accumulator means for storing said accumulated groups of signals,
    calculator means electrically connected to said storage means,
    printer means responsive to said calculator means for printing upon the chart carrying said trace,
    delimit pen means associated with said chart downstream from said recording pen, and
    operator-responsive delimit pen control means for actuating said delimit pen to indicate beginning and end of component marks on said chart and to control said accumulator for accumulating in one total the groups of said signals corresponding to each selected component of said trace.

2. The system of claim 1 further including operator responsive calculate control means to initiate calculation of predetermined information with respect to each selected component of said trace whereby said printer means prints out said information upon said chart.

3. The system of claim 2 wherein said delimit pen means is arranged downstream of the recording pen at a distance corresponding to approximately one hundred sampling intervals of said sampling means.

4. The system of claim 1 wherein said sampling means includes analog voltage means associated with said recording pen and analog-to-digital converter means for successively developing said groups of digital signals in response to said analog voltage means.

5. The system of claim 2 wherein said calculate control means initiates calculation of the ratio of area under the trace of each said component to the total area under all the components.

6. The system of claim 5 wherein said calculator multiplies the ratio of each component by a proportionality constant.

7. A system for selecting components of an analog chart trace during a recording run in which the trace is formed on an advancing chart by a recording means, including
    sampling means for successively developing electrical signals related to the instantaneous amplitude position of the recording means at predetermined sampling intervals of said trace,
    delimit pen means associated with the advancing chart spaced from the recording means by a distance that includes multiple sampling intervals for placing component selection marks upon said chart when a view of significant fluctuations in the trace is visible to an operator,
    delay means connected to said sampling means for delaying the eectrical signals corresponding to a given sampling interval of the trace until that interval advances to a point opposite the delimit pen means,
    accumulation means connected to said delay means for selectively accumulating said delayed electrical signals, and
    operator-responsive control means connected to said delimit pen means and said accumulation means for placing marks upon the chart that define components to be evaluated and for controlling the accumulation of delayed electrical signals corresponding to sampling intervals within each component.

8. The system of claim 7 including
    evaluation means connected to the accumulation means for selectively evaluating said accumulated signals,
    printer means connected to said evaluation means for printing evaluated data upon said chart, and
    evaluation control means for selectively initiating an evaluation routine after the given components of a trace are selected.

9. The system of claim 7 wherein the delimit pen is spaced from the recording means by a distance that includes about one hundred sampling intervals.

10. A method of selecting components of an analog chart trace, for evaluation, during the recording run in which the trace is formed upon an advancing chart by a recording means including the steps of
    successively developing electrical signals related to the instantaneous amplitude position of the recording means at predetermined sampling intervals of said trace,
    delaying said electrical signals for a predetermined time necessary for the chart to advance a distance that includes multiple sampling intervals so that a view of significant fluctuations in the trace is visible to an operator,
    placing marks upon said chart after said advancement at operator-selected points to select components of the trace, and
    accumulating in a total the delayed electrical signals corresponding to each selected component of said trace.

* * * * *